US012607964B2

(12) United States Patent
Huot-Marchand et al.

(10) Patent No.: US 12,607,964 B2
(45) Date of Patent: Apr. 21, 2026

(54) SYSTEM FOR ADJUSTING AN ILLUMINATION FUNCTION OF A WATCH

(71) Applicant: ETA SA Manufacture Horlogère Suisse, Grenchen (CH)

(72) Inventors: Sylvain Huot-Marchand, Eschert (CH); Dominique Dubugnon, Saint-Prex (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 274 days.

(21) Appl. No.: 18/503,257

(22) Filed: Nov. 7, 2023

(65) Prior Publication Data

US 2024/0210881 A1 Jun. 27, 2024

(30) Foreign Application Priority Data

Dec. 22, 2022 (EP) .................................... 22215940

(51) Int. Cl.
*G04B 19/30* (2006.01)
*G04G 21/08* (2010.01)

(52) U.S. Cl.
CPC ............. *G04B 19/30* (2013.01); *G04G 21/08* (2013.01)

(58) Field of Classification Search
CPC ......... G04B 19/30; G04C 19/02; G04G 21/08
See application file for complete search history.

(56) References Cited

U.S. PATENT DOCUMENTS 3,757,511 A * 9/1973 Burgess ................ G01J 1/4204 257/E27.128
2012/0120776 A1 5/2012 Fleury et al.
2014/0301168 A1 10/2014 Fleury et al.
(Continued)

FOREIGN PATENT DOCUMENTS

CN 105068413 A 11/2015
EP 2 290 478 A1 3/2011
(Continued)

OTHER PUBLICATIONS

Office Action issued Oct. 8, 2024, in corresponding Japanese Patent Application No. 2023-191686, 6 pages.
(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A system for adjusting an illumination function of a watch including an external timepiece element with an autonomous lighting device, the system including a portable electronic device with a communication unit and a controller to control this communication unit, the lighting device being formed by an assembly of stacked layers connected together and each including one or more of the following functional elements: a light source for generating light in a visible face of the body of the at least one external timepiece element; a self-contained power supply unit; a communication module; and a control unit to control the switching on or off of the light source and to control the communication module, the external timepiece element and the device to be connected to each other to adjust the illumination of the external timepiece element.

11 Claims, 3 Drawing Sheets

(56) References Cited

U.S. PATENT DOCUMENTS

| | | | |
|---|---|---|---|
| 2016/0287142 A1 | 10/2016 | Han et al. |
| 2017/0185048 A1 | 6/2017 | Yuen |
| 2018/0101140 A1 | 4/2018 | Yuen |
| 2019/0094384 A1 | 3/2019 | Baba et al. |

FOREIGN PATENT DOCUMENTS

| | | | |
|---|---|---|---|
| JP | 53-86258 | | 7/1978 |
| JP | 8-22755 | A | 1/1996 |
| JP | 2013-503327 | A | 1/2013 |
| JP | 2015-152401 | A | 8/2015 |
| KR | 20-2010-0009707 | U | 10/2010 |
| KR | 10-2016-0119612 | A | 10/2016 |

OTHER PUBLICATIONS

European Search Report issued Jun. 1, 2023 in European Application 22215940.2 filed on Dec. 22, 2022, 3 pages (with English Translation of Categories of Cited Documents).
Korean Office Action issued on May 29, 2025, in Korean Patent Application No. 10-2023-0182190 (with English translation), 12 pages.
Japanese Office Action issued on Jul. 29, 2025 in Japanese Patent Application No. 2023-191686 (with unedited computer-generated English translation), 5 pages.

* cited by examiner

SYSTEM FOR ADJUSTING AN ILLUMINATION FUNCTION OF A WATCH

CROSS-REFERENCE TO RELATED APPLICATION

This application claims priority to European Patent Application No. 22215940.2 filed on Dec. 22, 2022, the entire disclosure of which is hereby incorporated herein by reference.

TECHNICAL FIELD OF THE INVENTION

The invention relates to a system for controlling/adjusting an illumination function of a watch comprising at least one external timepiece element provided with an autonomous lighting device.

TECHNOLOGICAL BACKGROUND

In the prior art, systems for controlling a light source intended to provide a watch with an illumination function are known. Such systems typically comprise a push-button associated with this light source. When the push-button is pressed, the light source is switched on or off as required.

One of the major drawbacks of such systems lies in the fact that such a push-button dedicated to this function is typically located at a given point on the periphery of the watch case, which often makes it difficult to access and thus requires the wearer of the watch to carry out complex operations to locate and operate it by fumbling in the dark.

Moreover, integrating such a push-button into the watch requires a dedicated hole to be made in the middle of the watch case, which can pose a risk to the water-resistance of this case.

Another drawback lies in the fact that such a push-button often has only two modes of operation for switching the light source on and off as required. Such modes do not allow the light intensity of this source to be adjusted according to the brightness of the environment in which this watch is located.

Under these conditions, it is understood that there is a need to find a solution that overcomes the drawbacks of the prior art.

SUMMARY OF THE INVENTION

The purpose of the invention is to overcome these drawbacks by providing a system for controlling/adjusting an illumination function of a watch, which system is simple to use, robust and reliable.

To this end, the invention relates to a system for adjusting an illumination function of a watch comprising at least one external timepiece element provided with an autonomous lighting device, the system including a portable electronic device provided with a communication unit and a controller configured to control this communication unit, the lighting device being formed by an assembly (9*a*, 9*b*) of a plurality of stacked layers connected together and each including one or more of the following functional elements:

- at least one light source capable of generating light in a visible face of the body of said at least one external timepiece element;
- a self-contained power supply unit;
- a communication module; and
- a control unit configured to control the switching on or off of said at least one light source and to control the communication module, said external timepiece element and said device being configured to be connected to each other to adjust the illumination of said at least one external timepiece element.

In other embodiments:

- said device is configured to generate and transmit to said external timepiece element at least one instruction for controlling the illumination from said at least one light source;
- said apparatus is configured to generate and transmit to said external timepiece element at least one instruction for configuring illumination rules for said at least one light source;
- the control unit is configured to control the illumination of said at least one external timepiece element as a function of said at least one instruction received by the external timepiece element for controlling the illumination from said at least one light source;
- the control unit is configured to control the illumination of said at least one external timepiece element as a function of said at least one instruction received by the external timepiece element for configuring illumination rules for said at least one light source;
- the controller comprises a plurality of modes for the illumination of said at least one external timepiece element, which modes can constitute an instruction for controlling the illumination from said at least one light source of this external element;
- the controller comprises a plurality of scenarios for the illumination of said at least one external timepiece element, which scenarios can constitute an instruction for configuring illumination rules for said at least one light source of this external timepiece element;
- the communication unit and the communication module are configured to be connected to each other by establishing wireless communication, in particular near-field communication;
- said assembly comprises:
  - a first layer forming a visible face (20*a*) of the external timepiece element comprising said at least one light source of the external timepiece element;
  - a second layer comprising the photovoltaic module of the self-contained power supply unit;
  - a third layer comprising an electrical accumulator of the self-contained power supply unit; and
  - a fourth layer forming a hidden face of the external timepiece element comprising the control unit and the communication module;
- said assembly comprises:
  - a first layer forming a visible face of the external timepiece element comprising said at least one light source of this external timepiece element;
  - a second layer comprising the photovoltaic module of the self-contained power supply unit; and
  - a third layer forming a hidden face of the external timepiece element comprising an electrical accumulator of the self-contained power supply unit, the control unit and the communication module;
- a first layer of the assembly comprises at least one event sensor connected to the control unit.

BRIEF DESCRIPTION OF THE FIGURES

The purposes, advantages and features of the watch according to the invention will appear more clearly in the following description which is given on the basis of at least one non-limiting embodiment shown by way of the drawings, in which.

DETAILED DESCRIPTION OF THE INVENTION

Figure 1:
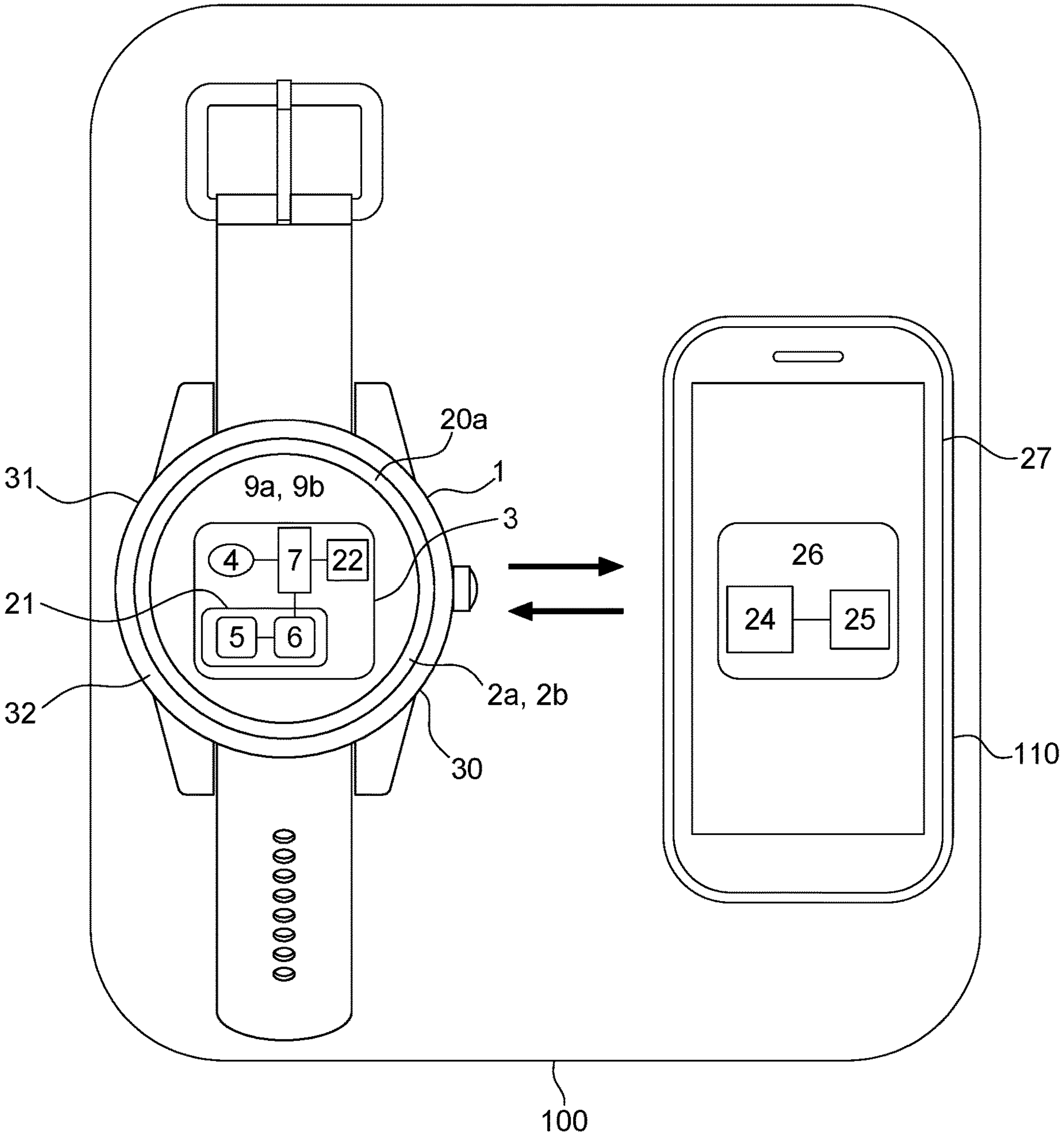
FIG. 1 is a diagrammatic representation of a system for controlling/adjusting an illumination function of a watch comprising at least one external timepiece element provided with an autonomous lighting device, according to one embodiment of the invention.

FIG. 1 illustrates a system 100 for controlling/adjusting an illumination/lighting function of a watch comprising at least one external timepiece element provided with an autonomous lighting device. Such an illumination function of this watch is capable of being configured in particular from a mobile or portable electronic device 110 of this system 100. Such an electronic device 110 more specifically allows this function to be adjusted by transmitting, as will be seen hereinbelow, relevant instructions to a control unit of the autonomous lighting device arranged in said at least one external timepiece element of this watch. It is understood that adjusting this function thus allows the features of this illumination of the external timepiece element of the watch to be varied depending on the desires/wishes of the user of this watch in order to create surprising functional, aesthetic and/or entertaining effects, by contrast with non-illuminated parts of this external timepiece element. It should be noted that such illumination of this external timepiece element can have a more or less diffuse, discreet, soft and pleasant appearance, and these features can be varied practically ad infinitum depending on the desired aesthetic result, which increases the final aesthetic quality of the watch.

Such a system 100 thus comprises the portable electronic device in addition to said watch, both of which are capable of carrying out data exchanges between one another by implementing a near-field communication technology for example.

In this context, the watch can, for example, be an electronic, electromechanical and/or mechanical watch, and in particular a sports watch or a so-called "luxury" watch. In such a watch 1, the external timepiece elements 2*a*, 2*b* correspond to all of the component parts of the watch surrounding a movement, contributing in particular to the external presentation, protection, fastening and control thereof. These external timepiece elements further give this watch its aesthetic appearance and style, and allow all its functions to be indicated. More specifically and with reference to FIGS. 1 and 2, these component parts considered here include, in a non-exhaustive and non-limiting manner: a back, a middle 31, a dial 2*a*, 2*b*, a bezel 32, a push-button, a winding button and/or a winding button cap, etc.

In the description hereinbelow, all parts of the watch that are well known to a person skilled in the art will only be explained in a simplified manner.

In FIG. 1, the watch thus comprises the middle 31 which, together with the case back and the dial 2*a*, 2*b*, delimits an interior volume of a case 30 of this watch. The case 30 is closed at the top by a crystal. For the purposes of this description, it will be assumed that the watch is a mechanical watch and that the movement thereof is disposed in the middle 31 of the watch case 30. In this configuration, at least one external timepiece element 2*a*, 2*b* of this watch 1 comprises an autonomous lighting device 3 provided with at least one light source 4. The light produced by said at least one light source 4 illuminates all or part of the external timepiece element 2*a*, 2*b* to be illuminated, namely the dial 2*a*, 2*b* in the particular embodiment illustrated in FIGS. 1 to 5.

It should be noted that in the example embodiment of the invention described, the horological movement is a mechanical movement. In one alternative embodiment, this movement can be an electronic movement or an electromechanical movement. A watch can be referred to herein as mechanical when its movement is mechanical, and as electromechanical or electronic when it includes electromechanical or electronic movements respectively.

In this configuration, the horological movement drives, in a manner known to a person skilled in the art, a display comprising an hour hand, a minute hand and optionally a seconds hand. To this end, the dial 2*a*, 2*b* includes a through-hole receiving the arbor of the hands.

In the particular embodiment shown in FIG. 1, the external timepiece element, in this case a dial, thus comprises the autonomous lighting device. This lighting device 3 has its own power supply means, as will be seen hereinbelow. Such a lighting device 3 is referred to as autonomous, particularly in relation to the movement of the watch 1 and in particular the energy source driving this movement. For example, this energy source is typically an electric power supply such as in an electromechanical movement or an electronic movement. Under these conditions, it is understood that the power used by this lighting device 3 is not used to the detriment of the autonomy of such a movement.

Such a lighting device 3 includes functional elements such as: said at least one light source 4, a self-contained power supply unit 21, a communication module 22 and a control unit 7.

In this lighting device 3, the power supply unit 21 comprises an electrical accumulator 6 and a photovoltaic module 5 comprising at least one photovoltaic cell, also referred to as a solar cell. This photovoltaic module 5 is connected to the electrical accumulator 6 via connection elements given the reference numerals 17*b* and 18 in FIGS. 3 and 5. This photovoltaic module 5 can comprise one or more unit cells of the heterojunction or multijunction type, connected in parallel or in series. Each photovoltaic cell of the module can be made, in a manner known to a person skilled in the art, from semiconductor materials containing copper, indium, gallium and selenium, containing cadmium telluride, containing monocrystalline gallium arsenide or containing monocrystalline or polycrystalline silicon, or perovskites. It should be noted that these examples are not limiting and that a person skilled in the art will be able to find the type of photovoltaic cell suitable for the invention.

In this lighting device 3, the control unit 7, also referred to as a microcontroller, includes an electronic circuit 8 including hardware resources, in particular at least one processor cooperating with memory elements as well as address, data and control buses. This control unit 7 comprises, in its memory elements, an algorithm for managing the illumination of said at least one light source 4. Such an algorithm is executed by the processor of this control unit 7, taking into account illumination instructions received from the portable electronic device and/or data from event sensors included in the lighting device 3 and/or the electronic device 110 in order to manage the operation of said at least one light source 4.

It should be noted that such data can, for example, provide information relating to events detected by these sensors, said events being likely to contribute to the switching on/off of said at least one light source 4. These events can comprise, in a non-limiting and non-exhaustive manner: the detection of a particular brightness level in the environment of the watch, the detection of a particular sound element or a particular sound level, the detection of a particular visual object, the detection of a movement made by a part of the user's body on which the watch and/or the electronic device is worn, the detection of a geographical location of the user of the watch and thus of the watch, the detection of a notification relating to a function of the electronic device, the detection of a notification relating to an application executed by the electronic device, the detection of the reception of a message by the electronic device, etc.

In this context, the event sensor of this autonomous lighting device 3 comprises in particular and in a non-limiting and non-exhaustive manner:

- a brightness sensor to detect the ambient brightness level;
- a motion sensor such as a gyroscopic and/or inertial sensor in the form of an electronic component of the gyroscopic and/or inertial microelectromechanical system circuit type;
- a microphone-type sound sensor, and/or
- an optical sensor of the photographic sensor type.

It should further be noted that this control unit 7 is able to manage/control the operation of the light sources 4 simultaneously and/or in sequence. Moreover, each light source 4 is managed/controlled separately by this control unit. In this context, the management of the operation of each light source 4 can consist of, in a non-limiting and non-exhaustive manner, switching this source 4 on and off.

Such a control unit 7 can further comprise, in its memory elements, an algorithm for managing the electrical accumulator 6, in particular for managing its recharging by the photovoltaic module 5 and for managing the electricity consumption of said light source 4.

In this lighting device 3, the communication module 22 is preferably wireless, and can be a near-field communication (NFC) module which thus implements, for example, short-range, high-frequency wireless communication technology. This communication module 22 can, for example, operate in the high-frequency HF frequency bands, for example at 13.56 MHz. Alternatively, such a wireless communication module 22 can be a Bluetooth™-type communication module.

Such a communication module 22, when of the NFC type, thus allows data to be exchanged over short distances between the watch 1, and in particular between said at least one external timepiece element 2*a*, 2*b*, and the electronic device 110. Such distances can be between approximately 0 and 10 cm, and preferably between 0 and 5 cm. The communication module 22 can be of the passive type with power supplied thereto by the radio frequencies transmitted by the communication device of the electronic device 110. Alternatively, the communication module 7 of the watch 1 can be of the active type receiving power from the power supply unit 21 of the lighting device.

Figure 3:
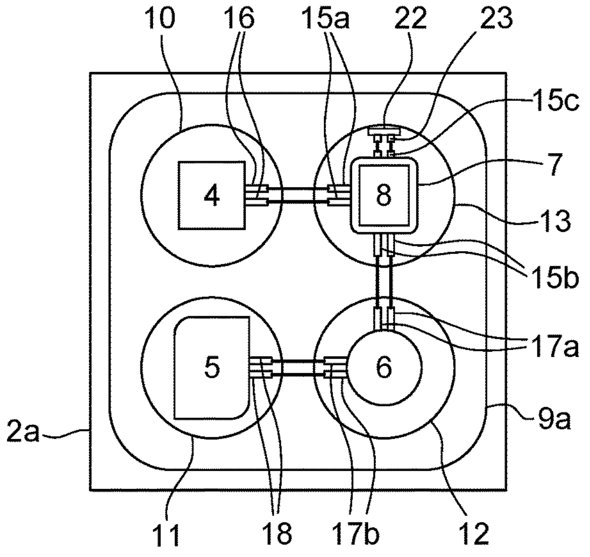
FIG. 3 shows a diagrammatic view of said assembly of layers forming the dial provided with the autonomous lighting device according to the embodiment of the invention.
Figure 4:
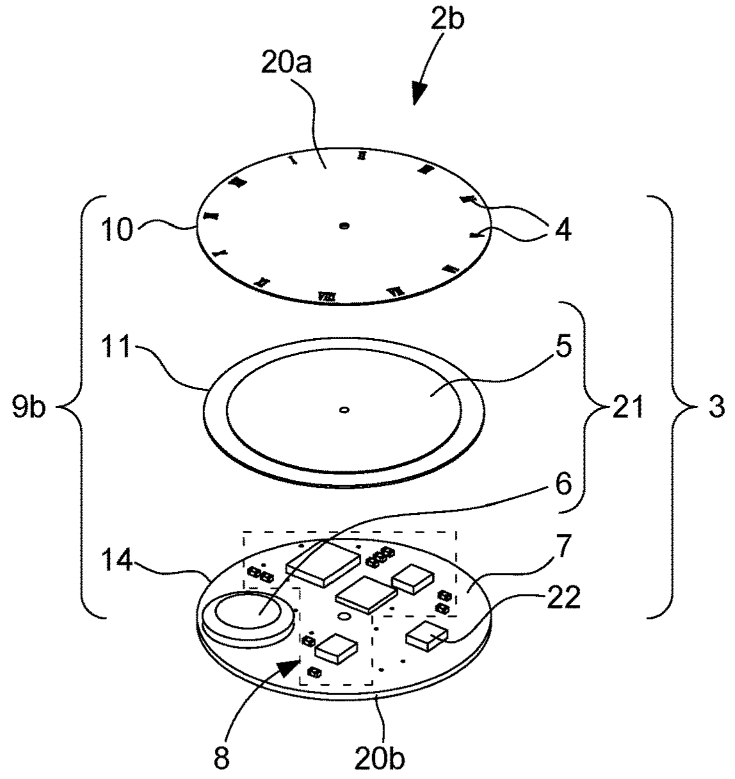
FIG. 4 shows an exploded view of a second alternative embodiment of said assembly comprising three stacked layers forming said dial provided with the autonomous lighting device, said layers each including one or more functional elements of the lighting device according to the embodiment of the invention.

More specifically and with reference to FIG. 3, the communication module 22 comprises an electronic chip, at least one antenna and a connector 23 for connecting said module 22 to the control unit 7. The chip, which is connected to said at least one antenna, comprises hardware and software elements. In this context, the hardware and/or software elements of the chip include at least one microprocessor cooperating with memory elements.

In this system 100, the portable electronic device 110, also referred to as a user terminal, is a device capable of being worn and carried by a user. This is the case for a smartphone, a phablet or a tablet for example. It goes without saying that the devices requiring a mains power supply, for example desktop computers, are excluded from this definition. Devices 110 such as a laptop computer to which a sensor is connected wirelessly or by wire are further excluded from this definition. This electronic device 110 comprises a case 27 in which an electronic circuit 26 is arranged. This electronic circuit 26 includes a controller 24 and a communication unit 25, in particular a near-field communication (NFC) unit 25, both powered by a battery. This controller 24 is capable of executing instructions to implement a computer program configured, for example, to process requests/instructions/data from/to the watch 1, in particular from/to its control unit 7. The electronic device 110 can further include a camera and an input interface such as a touch screen or buttons.

As mentioned above, this device 110 further comprises event sensors such as:

- a brightness sensor to detect the ambient brightness level;
- a microphone-type sound sensor;
- an optical sensor of the photographic sensor type;
- a position determination sensor;
- a module for generating an alert or alarm linked to an event such as:
  - the receipt of a message by the device 110 such as an instant message, SMS (Short Message Service) message, iMessage™, electronic message or MMS (Multimedia Messaging Service) message;
  - a notification relating to an application, also referred to as an "app", executed by device 110, a clock function (alarm function, countdown function, chronograph function, etc.), or an activity and/or health function (pedometer function, heart rate monitor function, body temperature function, etc.).

Furthermore, such a controller 24 is in particular able to execute instructions for implementing a computer program which is configured to process, for example, the requests/instructions/data received from/sent to the control unit 7 of the lighting device 3.

Furthermore, this controller 24 is also capable of executing a computer program also referred to as an "application" or "app". More specifically in this context, the application is an "illumination management application of the watch". When executed by the controller 24, this application is thus able to generate at least one instruction aimed at ensuring the immediate or automatic management of the illumination of the watch 1 and in particular of said at least one external timepiece element 2*a*, 2*b*. To do this, the memory elements of this controller 24 comprise:

- a plurality of modes for the illumination of said at least one external timepiece element 2*a*, 2*b*, which modes can constitute an instruction for controlling the illumi-

- nation from said at least one light source 4 of this external timepiece element 2*a*, 2*b*, and/or
- a plurality of scenarios for the illumination of said at least one external timepiece element 2*a*, 2*b*, which scenarios can constitute an instruction for configuring illumination rules for said at least one light source 4 of this external timepiece element 2*a*, 2*b*.

It should be noted that when this application is executed by the electronic device 110, an interface generated by the execution of this application is then displayed on the screen of this device 110 allowing the user, by interacting with this interface, to configure an illumination mode and/or scenario.

In this configuration, the user can select an illumination mode for the external timepiece element 2*a*, 2*b* in order to immediately control said at least one light source 4 according to the management configuration for this illumination which is defined in this mode. More specifically, each mode comprises an illumination management configuration that is different from that of another mode. In a non-limiting and non-exhaustive manner, the one or more differences lie in:

- the configuration of the operating parameters of each light source 4, i.e. its brightness, colour, etc.;
- the selection of the light sources 4 to be operated or used;
- the selection of a light source 4 to be operated or used; and/or
- the scope of operation of one or more light sources 4, namely: sequentially switching on or off, or simultaneously switching on or off two or more light sources 4, flashing one or more light sources 4, or defining a flashing frequency for each light source 4, a flashing duration for each light source 4, or a switching on or off duration for each light source 4;
- etc.

Moreover, the user can further select an illumination scenario for the external timepiece element 2*a*, 2*b* in order to automatically control the illumination from said at least one light source 4 according to the management configuration for this illumination which is defined in this scenario. This scenario defines the automatic management of the illumination from said at least one light source 4 on the basis of event data from the one or more event sensors included in the external timepiece element 2*a*, 2*b*. Alternatively or additionally, this data can also come from the electronic device 110 which transmits it to the control unit 7 as soon as the event is detected by at least one event sensor in the device 110. It should be noted that each scenario comprises an illumination management configuration that is different from that of another scenario. In a non-limiting and non-exhaustive manner, the one or more differences lie in:

- the selection of the one or more event sensors to be used in the lighting device 3 and/or in the device 110;
- the configuration of the operating parameters of each light source 4, i.e. its brightness, colour, etc.;
- the selection of the light sources 4 to be operated or used;
- the selection of a light source 4 to be operated or used; and/or
- the scope of operation of one or more light sources 4, namely: sequentially switching on or off, or simultaneously switching on or off two or more light sources 4, flashing one or more light sources 4, or a flashing frequency for each light source 4, a flashing duration for each light source 4, or a switching on or off duration for each light source 4;
- etc.

With reference to FIGS. 2 to 5 and as previously mentioned, the autonomous lighting device 3 is thus included in the external timepiece element 2*a*, 2*b*. In this configuration, the functional elements of this lighting device 3, namely the light source 4, the electrical accumulator 6, the photovoltaic module 5, the communication module 22 and the control unit 7, are included in one or more layers 10, 11, 12, 13, 14 forming the external timepiece element 2*a*, 2*b*. In other words, the body of this external timepiece element 2*a*, 2*b* is formed by an assembly 9*a*, 9*b* of a plurality of stacked layers 10, 11, 12, 13, 14 connected together and each including one or more functional elements of the lighting device 3.

In this assembly 9*a*, 9*b*, the layers 10, 11, 12, 13, 14 are joined together by a joining element such as an adhesive substance so as to unify them in order to obtain a monolithic assembly 9*a*, 9*b* thus forming a one-piece external timepiece element 2*a*, 2*b*. This joining element can also be a clip or a screw. Such layers 10, 11, 12, 13, 14 are stacked in the assembly 9*a*, 9*b*, and are arranged one on top of the other in a defined order.

Thus, such a one-piece external timepiece element 2*a*, 2*b* (e.g.: dial, bezel) has the additional advantage of being able to be removably mounted in a case of the timepiece 1, in addition to facilitating its integration into or onto such a case.

More specifically, in first and second alternative embodiments, this assembly 9*a*, 9*b* comprises a first layer 10 forming/constituting a visible face 20*a* of the external timepiece element 2*a*, 2*b*. Such a first layer 10 is formed by a transparent or translucent or at least partially transparent or at least partially translucent substrate which is rigid or semi-rigid. Such a substrate is made of a material having a transmittance to solar radiation, in particular to ultraviolet radiation, also known as UVT (for "Ultra-Violet Transmission"), of between 65 and 95 percent. This transmittance is preferably 85 percent. Such a material can be transparent or translucent. This material can be, in a non-limiting and non-exhaustive manner, a polymer, glass or ceramic.

In this context, it is understood that this substrate is configured so that:

- the light produced by said at least one light source can escape to the outside of the external timepiece element 2*a*, 2*b* and thus of the watch 1, and
- the light coming from the environment of the watch 1 can penetrate the external timepiece element 2*a*, 2*b* in the direction of the photovoltaic module 5 of the lighting device 3, this light comprising solar radiation when it is of natural origin.

In other words, this transparent or translucent substrate is configured so that light radiation such as solar radiation can pass through it and power the photovoltaic module 5 so that the latter can convert the solar energy from this radiation into electrical energy.

Such a first layer 10 thus includes said at least one light source 4 of the lighting device 3 of the external timepiece element 2*a*, 2*b*.

In this device 3, any type of light source 4, such as a light-emitting element, can be used, for example:

- a light-emitting capacitor known by the acronym LEC;
- a light-emitting diode of the LED, OLED (Organic Light-Emitting Diode), AMOLED (Active-Matrix Organic Light-Emitting Diode) or QLED (Quantum Light-emitting Diode) type;
- any light-emitting material activated by a local electric field;
- any light-emitting material activated by an electric current;
- any combination of these light-emitting elements.

This said at least one light source 4 is arranged in a particular way on or in the substrate forming this first layer

10. Such an arrangement of the light source 4 is configured to illuminate all or part of the visible face 20*a* of the external timepiece element 2*a*, 2*b*. For example, when this external timepiece element 2*a*, 2*b* is a dial, all or part of the visible face 20*a* of this dial 2*a*, 2*b* can be illuminated, or at least one graphic representation present in or on the lower surface of this visible face 20*a* can be illuminated, such as:

a reference (or display) element such as, for example, a numeral, an index, a line or even a point contributing, with or without the hands, to the display of a horological information/parameter or a physical information/parameter measured by a sensor or the like included in the movement;

an inscription, a pattern, a text, a logo, etc.

This lighting can be backlighting or semi-direct lighting when the light source 4 is arranged in a cavity defined in the substrate. More specifically, this cavity can be a blind opening made in the lower surface of this substrate. In this configuration, when the bottom of this cavity comprises a graphic representation, the light radiation, or the light, produced by this light source 4 can escape to the outside of the external timepiece element 2*a*, 2*b* through the visible face 20*a* of this element 2*a*, 2*b*, thus allowing at least one graphic representation to be viewed in the dark. In particular, the light radiation escaping from the visible face 20*a* draws the outline of this graphic representation. In this context, this graphic representation included in or on the upper surface or on the lower surface of the substrate forming the first layer 10, is preferably opaque or non-translucent or non-transparent.

This lighting can be direct lighting when the light source 4 is arranged in a cavity defined in the substrate. This cavity can be a blind opening made in the lower surface of this substrate, the bottom of which is devoid of any graphic representation. In this configuration, the light radiation, or the light, produced by this light source 4 can escape through the bottom of this cavity towards the outside of the dial 2*a* and thus through the visible face 20*a* of this dial 2*a*.

This lighting can also be direct lighting when the light source 4 is arranged in a through-opening made in the substrate. In this context, this opening extends through the thickness of the substrate of this first layer 10, opening out at its two ends in the upper and lower surfaces of this substrate respectively. In this configuration, all or part of the light source 4 can project from the upper surface of this substrate and thus from the visible face 20*a* of this external timepiece element 2*a*, 2*b*.

Such lighting can also be indirect lighting when said at least one light source 4 is coupled to at least one waveguide. This waveguide, also referred to as a light guide, allows the light to be conveyed from the point where it is injected into the guide to the substrate or to an area of the substrate (for example a cavity, a through-opening) close to the upper surface of this substrate. Such a light guide can be an optical fibre that allows any obstacles that may appear in the substrate, for example between the light-emitting element and the region of the substrate close to the upper surface of this substrate, through which the light will escape, to be bypassed. In this alternative embodiment, light is thus transmitted from the light-emitting element, via the waveguide, to the area of the substrate to be illuminated.

In such a configuration, a first end of the waveguide is coupled to the light source 4 and a second end of this waveguide can be arranged in:

a cavity which can be a blind opening made in the lower surface of the substrate of this first layer 10, or a through-opening extending through the thickness of the substrate of the layer 10 and opening at its two ends respectively into the upper and lower surfaces of this substrate and thus of the first layer 10. This second end can thus project from the upper surface of the substrate and thus from the visible face 20*a* of the external timepiece element 2*a*, 2*b*.

In an example configuration, indirect lighting can be achieved by a single light source 4 included on the lower surface of the substrate of this first layer 10 and coupled to several waveguides, the second ends of which, when arranged in:

cavities each emit light radiation from this light source 4, this radiation escaping to the outside of the external timepiece element 2*a*, 2*b* via its visible face 20*a*, allowing, for example, at least one graphic representation present in the bottom of this cavity to be viewed, in particular in the dark, and/or through-openings projecting or not projecting from the upper surface of this layer in order to form graphic representations such as index-type reference elements, each emitting light radiation from this light source 4.

In the substrate of this first layer 10, the light source 4 is applied/attached to the lower surface of this substrate, in said cavity or on an internal wall of the aforementioned through-opening, by printing or evaporation.

It should further be noted that the lower surface of this first layer 10 can be self-adhesive so that it can contribute to the joining thereof with the second layer 11.

In the assembly 9*a*, 9*b* forming the external timepiece element 2*a*, 2*b*, the second layer 11 comprises a substrate including the photovoltaic module 5. This substrate is preferably flexible or pliable. Such a substrate can be a film on which this photovoltaic module 5 is arranged, for example, this substrate can be made of a material belonging to the polymer family. Such a photovoltaic module 5 preferably extends over the whole of a so-called active area of an upper surface of this substrate of the second layer 11. This active area is a portion of this upper surface of the substrate which is able to receive the light coming from the lower surface of the first layer 10 of the external timepiece element 2*a*, 2*b*. This light, which has passed through all or part of the first layer 10, comes from the external environment of the external timepiece element 2*a*, 2*b*, and thus that of the watch 1, in this case mainly from solar radiation when it is of natural origin. It should be noted that the first layer 10 can be configured to appear visually opaque, in particular to the human eye, while still allowing such solar radiation to pass therethrough.

It should be noted that the photovoltaic module 5 is applied to the upper surface of this substrate using inkjet or screen printing processes or using a thermal evaporation printing process. Reference will be made here to a second layer 11 comprising a printed photovoltaic module, in particular to a photovoltaic module printed on the substrate of the second layer 11.

Furthermore, it should be noted that once the photovoltaic module 5 has been applied to the substrate, a layer of a self-adhesive substance can be deposited on all or part of the upper surface and/or of the lower surface of this substrate. Under these conditions, the second layer 11 can be a self-adhesive layer which helps to facilitate its assembly/mounting/adhesion with the other layers 10, 12, in particular with the first layer 10 and/or a third layer 12 of this assembly 9*a*, 9*b*.

In this first alternative embodiment, the assembly 9*a* comprises this third layer 12 further including a preferably flexible or pliable substrate, including the electrical accumulator 6 of the autonomous lighting device 3. This substrate can be a film on which this accumulator 6 is placed. Such a substrate can be made of a material belonging to the polymer family.

It should be noted that this accumulator 6 can be a lithium battery or a semiconductor battery. Such an accumulator 6 is applied to an upper surface of this substrate using processes known in the prior art, such as:

- printing processes on a flexible polymer substrate, for example a lithium battery, or
- three-dimensional printing processes, for example for a semiconductor battery such as a lithium-metal semiconductor battery.

Reference will be made here to a third layer 12 comprising a printed electrical accumulator 6, in particular to an electrical accumulator 6 printed on the substrate of the third layer 12.

Such processes are used to obtain a third layer 12 comprising this accumulator 6 which is flexible and ultra-thin.

Furthermore, it should be noted that once the accumulator 5 has been applied to the substrate, a layer of a self-adhesive substance can be deposited on all or part of the upper surface and/or of the lower surface of this substrate. Under these conditions, the third layer 12 can be a self-adhesive layer which helps to facilitate its assembly/mounting/adhesion with the other layers 11, 13, in particular with the second layer 11 and/or a fourth layer 13 of this assembly 9*a*.

It should be noted that this accumulator 6 is used to store the electrical energy produced by the photovoltaic module 5 and to release it on demand to power said at least one light source 4.

Figure 2:
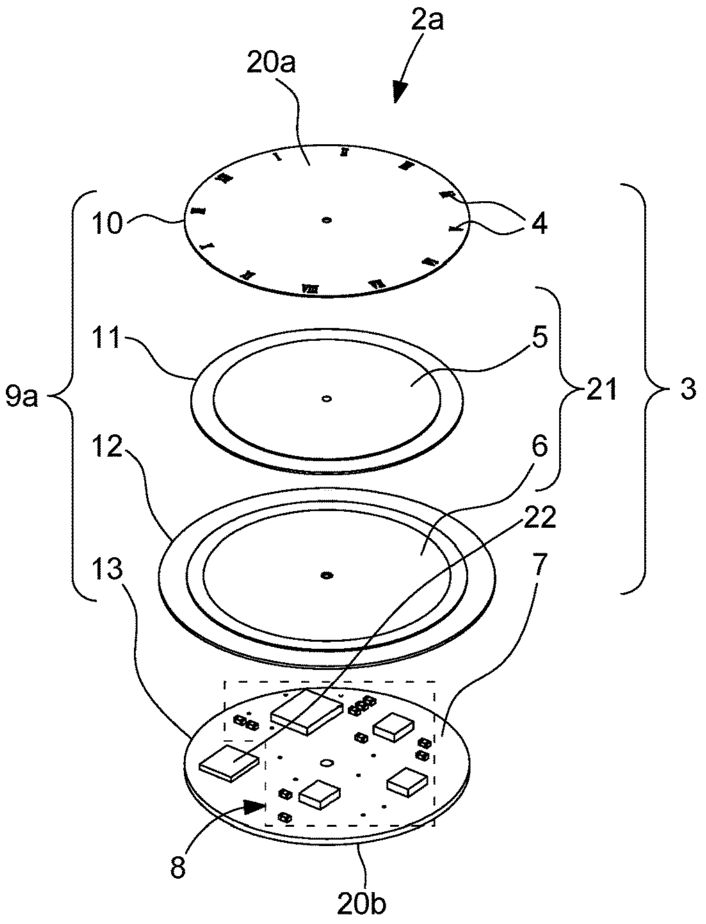
FIG. 2 shows an exploded view of a first alternative embodiment of the assembly of four stacked layers forming said external timepiece element, such as a dial, provided with the autonomous lighting device, said layers each including one or more component elements of the lighting device according to the embodiment of the invention.

In the first alternative embodiment illustrated in FIGS. 2 and 3, this assembly 9*a* comprises this fourth layer 13 forming the hidden face of the external timepiece element 2*a*. This fourth layer 13 is formed by a preferably flexible or pliable substrate including the control unit 7 and the communication module 22. Such a substrate can be, for example, a flexible PCB on which this control unit 7 and the communication module 22 are arranged, in particular on the upper surface of this PCB and thus of the substrate. In this context, the communication module 22 and the control unit 7 can be built on this upper surface of the substrate using three-dimensional printing processes or polymer printing processes.

In the second alternative embodiment, this assembly 9*b* forming the external timepiece element 2*b* comprises three interconnected layers 10, 11, 14. It should be noted that this second alternative embodiment differs from the first alternative embodiment in that it comprises three layers 10, 11, 14 instead of four as in the first alternative embodiment. In this second alternative embodiment, the electrical accumulator 6 of the autonomous lighting device 3 is now included in the third and last layer 14 of this assembly 9*b* with the control unit 7 and the communication module 22.

Such a third layer 14 forming the hidden face of the external timepiece element 2*b*, consists of a preferably flexible or pliable substrate, on which are built, preferably on the upper surface of this substrate, the accumulator 6, the communication module 22 and the electronic circuit 8 constituting the control unit 7. The accumulator 6, the communication module 22 and the control unit 7 can be built in this way on this upper surface of the substrate using three-dimensional printing processes or polymer printing processes. It should be noted that such a substrate can be a flexible PCB for example.

To summarise, in this second alternative embodiment, the assembly 9*b* thus comprises:

- a first layer 10 forming the visible face 20*a* of the external timepiece element 2*b* including said at least one light source 4 of the lighting device 3;
- a second layer 11 including the photovoltaic module 5, and
- the third layer 14 forming the hidden face 20*b* of the external timepiece element 2*b* including the accumulator 6, the communication module 22 and the control unit 7.

It should be noted that in this second alternative embodiment, the first and second layers 10, 11 are similar to those of the first alternative embodiment of the assembly 9*a*.

Figure 5:
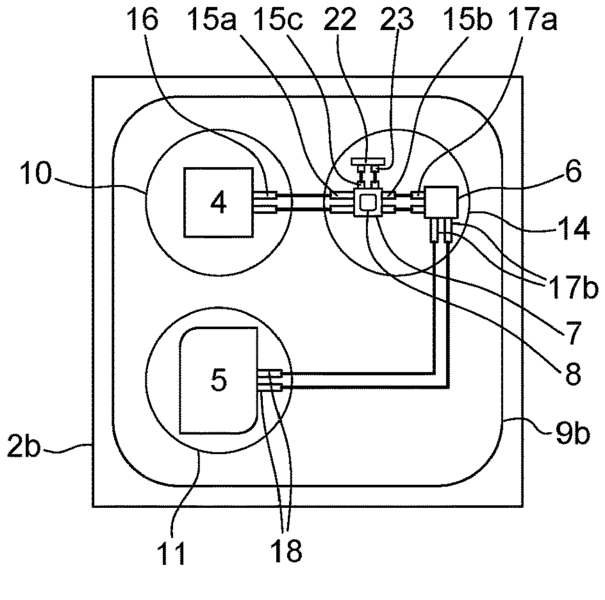
FIG. 5 shows a diagrammatic view of this second alternative embodiment of said assembly of layers forming the dial provided with the autonomous lighting device, according to the embodiment of the invention.

Furthermore, with reference to FIGS. 3 and 5, the electronic circuit 8 of the control unit 7 comprises first connection elements 15*a* which are connected to connection elements 16 of said at least one light source 4 for managing the operation of this light source 4. This electronic circuit 8 further comprises second connection elements 15*b* connected to first connection elements 17*a* of the accumulator 6. This accumulator 6 further includes second connection elements 17*b* connected to connection elements 18 of the photovoltaic module 5. The electronic circuit 8 of the control unit 7 further comprises third connection elements 15*c* connected to connection elements 23 of the communication module 22.

It should further be noted that the above-mentioned event sensors of the lighting device 3 are preferably arranged in the first layer 10 and/or the last layer 13, 14 of the assembly 9*a*, 9*b* and are connected to the control unit 7 of this device 3.

In a third alternative embodiment not shown, the assembly forming the external timepiece element comprises two interconnected layers. It should be noted that this third alternative embodiment differs from the second alternative embodiment in that it comprises two layers instead of three layers 10, 11, 14 as in this second alternative embodiment. In this third alternative embodiment, the photovoltaic module 5 of the autonomous lighting device 3 is now included in the first layer and in particular on the lower surface of the substrate forming this first layer. This photovoltaic module 5 can be applied to this lower surface of the substrate of this first layer using inkjet or screen printing processes or using thermal evaporation printing processes. It should thus be noted that this first layer is thus similar to the first layers 11 of the first and second alternative embodiments, with the exception that in this third alternative embodiment, the first layer additionally comprises the photovoltaic module.

Moreover, in the third alternative embodiment, and similarly to the second alternative embodiment, the electrical accumulator 6 of the autonomous lighting device 3 is included in the second and last layer of this assembly with the control unit 7. Such a second layer, forming the hidden face of the external timepiece element, consists of a preferably flexible or pliable substrate, on which are built, preferably on the upper surface of this substrate, the accumulator 6 and the electronic circuit 8 constituting the control unit 7. This accumulator 6 and the control unit 7 can be built in this way on the upper surface of the substrate using three-dimensional printing processes or polymer printing processes. It should be noted that such a substrate can be a flexible PCB for example.

To summarise, in this third alternative embodiment, the assembly thus comprises:

a first layer forming the visible face 20*a* of the external timepiece element including said at least one light source 4 and the photovoltaic module 5 of the lighting device 3, and a second layer forming the hidden face 20*b* of the external timepiece element including the accumulator 6 and the control unit 7.

In this system 100, the electronic device 110 and the watch 1, more specifically the lighting device 3, are configured to establish a wireless connection between them, preferably a near-field connection. This connection can be automatic as soon as the position of this watch is determined to be, relative to the electronic device 110, at a distance that allows such a connection to be established. Once this connection has been established, this device 110 and this lighting device 3 can exchange data, in particular by transmitting, via:

the device 110, at least one instruction received by the lighting device 3 for controlling the illumination from said at least one light source 4, and/or the device 110, at least one instruction received by the lighting device 3 for configuring illumination rules for said at least one light source 4, and/or the watch, a request to verify a state of detection of at least one event by at least one event sensor of the device 110 for the implementation, by the control unit 7, of said at least one instruction for configuring illumination rules.

It should be noted that these data exchanges are implemented in particular when the application is executed by the controller 24 of the electronic device 110 as soon as the connection is established between this device 110 and the watch 1.

It goes without saying that the present invention is not limited to the embodiments described above and that various simple modifications and alternative embodiments can be envisaged by a person skilled in the art without departing from the scope of the invention as defined by the appended claims.

The invention claimed is:

1. A system for adjusting an illumination function of a watch, the system comprising:

the watch comprising at least one external timepiece element provided with an autonomous lighting device; and a portable electronic device provided with a communication unit and a controller configured to control said communication unit, wherein the lighting device is formed by an assembly of a plurality of stacked layers connected together and each including one or more of the following functional elements:

at least one light source capable of generating light in a visible face of a body of said at least one external timepiece element;

a self-contained power supply unit;

a communication module; and a control unit configured to control switching on or off of said at least one light source and to control the communication module, said external timepiece element and said portable electronic device being configured to be connected to each other to adjust the illumination of said at least one external timepiece element, wherein said assembly comprises:

a first layer forming a visible face of the external timepiece element comprising said at least one light source of the external timepiece element mounted on the first layer; and a second layer positioned beneath the first layer and comprising a photovoltaic module of the self-contained power supply unit.

2. The system according to claim 1, wherein said portable electronic device is configured to generate and transmit to said external timepiece element at least one instruction for controlling the illumination from said at least one light source.

3. The system according to claim 2, wherein the control unit is configured to control the illumination of said at least one external timepiece element as a function of said at least one instruction received by the external timepiece element for controlling the illumination from said at least one light source.

4. The system according to claim 1, wherein said portable electronic device is configured to generate and transmit to said external timepiece element at least one instruction for configuring illumination rules for said at least one light source.

5. The system according to claim 4, wherein the control unit is configured to control the illumination of said at least one external timepiece element as a function of said at least one instruction received by the external timepiece element for configuring illumination rules for said at least one light source.

6. The system according to claim 1, wherein the controller comprises:

a plurality of modes for the illumination of said at least one external timepiece element, which modes can constitute an instruction for controlling the illumination from said at least one light source of the external timepiece element, and/or a plurality of scenarios for the illumination of said at least one external timepiece element, which scenarios can constitute an instruction for configuring illumination rules for said at least one light source of the external timepiece element.

7. The system according to claim 1, wherein the communication unit and the communication module are configured to be connected to each other by establishing wireless communication.

8. The system according to claim 7, wherein the wireless communication is near-field communication.

9. The system according to claim 1, wherein said assembly comprises:

a third layer comprising an electrical accumulator of the self-contained power supply unit; and a fourth layer forming a hidden face of the external timepiece element comprising the control unit and the communication module.

10. The system according to claim 1, wherein said assembly comprises:

a third layer forming a hidden face of the external timepiece element comprising an electrical accumulator of the self-contained power supply unit, the control unit and the communication module.

11. The system according to claim 1, wherein said first layer of the assembly comprises at least one event sensor connected to the control unit.

* * * * *